United States Patent
Yersak et al.

(10) Patent No.: US 10,629,949 B2
(45) Date of Patent: Apr. 21, 2020

(54) PASSIVATION OF SULFIDE, OXIDE, AND OXYSULFIDE GLASS ELECTROLYTE FILMS FOR LITHIUM METAL BATTERIES

(71) Applicant: GM GLOBAL TECHNOLOGY OPERATIONS LLC, Detroit, MI (US)

(72) Inventors: Thomas A. Yersak, Ferndale, MI (US); Xingcheng Xiao, Troy, MI (US); James R. Salvador, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 15/494,745

(22) Filed: Apr. 24, 2017

(65) Prior Publication Data

US 2018/0309166 A1    Oct. 25, 2018

(51) Int. Cl.
*H01M 10/0562* (2010.01)
*H01M 10/052* (2010.01)
(Continued)

(52) U.S. Cl.
CPC ....... *H01M 10/0562* (2013.01); *C03C 17/245* (2013.01); *H01M 4/0407* (2013.01); *H01M 4/134* (2013.01); *H01M 4/1395* (2013.01); *H01M 4/381* (2013.01); *H01M 4/382* (2013.01); *H01M 10/052* (2013.01); *H01M 10/054* (2013.01); *H01M 10/0585* (2013.01); *C03C 2217/214* (2013.01); *C03C 2217/22* (2013.01); *C03C 2217/24* (2013.01); *C03C 2218/152* (2013.01); *C03C 2218/32* (2013.01); *H01M 2300/0068* (2013.01); *H01M 2300/0071* (2013.01); *H01M 2300/0094* (2013.01)

(58) Field of Classification Search
CPC combination set(s) only.
See application file for complete search history.

(56) References Cited

U.S. PATENT DOCUMENTS

| 2014/0134504 A1* | 5/2014 | Brown | C04B 35/447 429/403 |
| 2015/0064537 A1* | 3/2015 | Christensen | H01M 10/0562 429/126 |

(Continued)

OTHER PUBLICATIONS

Steven M. George; Atomic Layer Deposition: An Overview; Department of Chemistry and Biochemistry and Department of Chemical and Biological Engineering, University of Colorado, Boulder, Colorado, 80309; 10.1021/cr900056b; American Chemical Society; Published on Web Nov. 30, 2009.

(Continued)

*Primary Examiner* — Christopher P Domone
(74) *Attorney, Agent, or Firm* — Reising Ethington P.C.

(57) ABSTRACT

Certain glass, glass-ceramic, and ceramic electrolyte bodies formed from lithium or sodium sulfides and glass-forming sulfides, sulfoxides and/or certain glass-forming oxides provide good conductivity of lithium ions or sodium ions for use in lithium metal electrode or sodium metal electrode battery cells. The stability of the lithium or sodium metal anode-glass electrolyte interface is improved by forming a metal oxide passivation layer by atomic layer deposition on the facing surface of the electrolyte and activating the coating by contact of the passivated surface with the lithium or sodium electrode material.

16 Claims, 2 Drawing Sheets

(51) Int. Cl.
*H01M 10/0585* (2010.01)
*H01M 4/1395* (2010.01)
*H01M 4/04* (2006.01)
*H01M 4/38* (2006.01)
*H01M 10/054* (2010.01)
*H01M 4/134* (2010.01)
*C03C 17/245* (2006.01)

(56) References Cited

U.S. PATENT DOCUMENTS

2016/0156065 A1* 6/2016 Visco ................ H01M 10/0562
429/322
2018/0301751 A1* 10/2018 Sakamoto ......... H01M 10/0562

OTHER PUBLICATIONS

Alexander S. Yersak et al.; Atmospheric pressure spatial atomic layer deposition web coating with in situ monitoring of film thickness; 01A130-1; J. Vac. Sci. Technol. A 32(1), Jan./Feb. 2014; 2014 American Vacuum Society.

* cited by examiner

PASSIVATION OF SULFIDE, OXIDE, AND OXYSULFIDE GLASS ELECTROLYTE FILMS FOR LITHIUM METAL BATTERIES

TECHNICAL FIELD

Lithium sulfides, lithium oxides, and lithium oxysulfides are being developed for use as glassy or ceramic solid electrolyte/separator films for use in combination with lithium metal anodes and compatible cathodes in lithium-metal batteries. Some of the most readily-made and ion-conductive lithium-containing, glass, glass-ceramic, and ceramic electrolyte compositions are not thermodynamically stable in face-to-face contact with a lithium metal anode. This disclosure provides a technique for the solid-state electrolyte/lithium interface in which a thin, passivating atomic layer deposition is applied to the intended contacting surface(s) of a vulnerable lithium-containing electrolyte composition. The same compatibility problems arise with analogous sodium-containing solid electrolyte/separator films for sodium-metal anodes, and the sodium-containing electrolyte films may be treated likewise.

BACKGROUND

Lithium-based batteries are finding increasing use in automotive vehicles and in other consumer products. And they have been developed with many different electrode and electrolyte compositions and many different structures for the electrodes, separators, electrolytes, and packaging members for the various lithium battery embodiments. Sodium batteries are also being developed for commercial applications.

Some lithium-based batteries employ a lithium metal anode in combination with a suitable solid electrolyte/separator member and a compatible active counter-electrode material. The solid electrolyte member is a glass, glass-ceramic, or ceramic composition which contains mobile lithium cations that are transportable between the lithium metal anode and a compatible cathode in the cyclical discharge and re-charge operations of the battery cell or assembly of cells. Examples of such electrochemical cells include, for example, lithium-$LiMO_2$ (M=Mn, Co, Ni, Al, etc.) cells, lithium-sulfur cells, and lithium-air cells. Some cells with metallic sodium anodes are also being developed with a solid electrolyte/separator formed of a sodium-ion conductive, glass, glass-ceramic, or ceramic composition.

The glass, glass-ceramic, or ceramic compositions must be prepared for conduction of their respective metal ions to and from the adjacent, overlying faces of the metal electrode during the many repeated cycles of the cell. Among desirable compositions for glasses or glass-ceramics for lithium cells are those which comprise lithium sulfides, oxides, or oxysulfides. Among the desirable compositions for ceramics for lithium cells are those which have a perovskite structure or a structure analogous to the NASICON structure (sodium (Na) SuperIonic CONductor); for example, a lithium-containing perovskite group oxide ($Li_{0.67-x}La_{3x}TiO_3$, LLTO) and a NASICON lithium aluminum titanium phosphate ($Li_{1.3}Al_{0.3}Ti_{1.7}(PO_4)_3$, LATP), both synthetic materials. But a problem arises with such lithium sulfide, oxysulfide, and oxide-containing glass electrolyte compositions, and glass-ceramics, and ceramics because their interfaces with their corresponding metal-electrode surfaces are not thermodynamically stable and the operation of the cell is degraded.

There remains a need to address the chemical stability problem at the interfaces of some lithium ion-containing or sodium ion-containing solid electrolyte surfaces and their corresponding metal electrode surfaces as the cell experiences repeated discharge and re-charge cycles.

SUMMARY

Certain electrolytes, suitably composed and prepared to contain mobile lithium cations, or sodium cations, can work with solid state electrodes for use in lithium metal or sodium metal batteries. These compositions may be formed as thin glass (generally amorphous), glass-ceramic (amorphous with dispersed crystalline phases), or ceramic (generally crystalline) electrolyte/separator layers (e.g., about ten micrometers to about two hundred micrometers in thickness) for subsequent placement in coextensive face-to-face contact against a facing surface of a lithium metal or sodium metal electrode. In the operation of such a battery cell, a suitable counter electrode is often placed in a like manner against the opposing surface of the solid electrolyte layer. During discharge of the battery cell, the metal electrode is the anode and a suitable counter-electrode material serves as the cathode. Lithium or sodium ions are stripped from the metal anode surface, flow through the solid electrolyte and enter the cathode, as electrons flow from the anode through an external circuit, including a power-consuming resistive load, and into the cathode. Such battery cells are expected to experience many discharge-recharge cycles during which unwanted side-reactions can occur within the compositions of the cell members.

One problem is the fact that many otherwise useful alkali metal-containing sulfide, oxysulfide, and oxide glasses/glass-ceramics/ceramics are not thermodynamically stable as an electrolyte when they are in appreciably intimate contact with a lithium or sodium metal surface. In the following specification, a process is disclosed for applying a very thin passivating alumina ($Al_2O_3$) coating to the metal anode-contacting surface of such sulfide, oxysulfide, and oxygen-containing electrolyte glasses/glass-ceramics/ceramics which suitably alters the composition at the surface, thereafter enabling effective operation of the battery cell. For purposes of brevity, the process will be described with the use of a lithium anode and a lithium-ion containing sulfide or oxysulfide glass electrolyte. But it is to be understood that, unless otherwise specified in specific situations, like processing steps may be conducted with an analogous sodium-containing electrolyte sulfide, oxysulfide, or oxide composition.

Glass and glass-ceramic, lithium-containing electrolytes for lithium metal cells may be formed from a combination of (i) one or more suitable glass formers such as, but not limited to, $P_2S_5$, $SiS_2$, $GeS_2$, $Al_2O_3$, $SiO_2$, $TiO_2$, $B_2O_3$, $GeO_2$ and $P_2O_5$, and (ii) a lithium-containing compound (sometimes termed a glass modifier), e.g., dilithium sulfide ($Li_2S$) (or disodium sulfide). In addition, ionically-conductive ceramic phases of lithium compounds may be precipitated from the glass electrolyte composition during an annealing process to form glass-ceramics; for example, $Li_3PS_4$, $Li_7P_3S_{11}$, and $Li_{10}P_2XS_{12}$, where X is Ge, Sn, Si.

Furthermore, lithium-containing oxide ceramics may be made with a perovskite structure (LLTO) or a NASICON structure (LATP).

In general, a suitable glass former is a material with an amorphous covalent network of atoms having a "fused" structure resulting from the covalent bonds. For example, $P_2A_5$ forms a network of covalent phosphorus-sulfur bonds. A suitable glass modifier, such as $Li_2S$, provides an ionic bonding character to the resulting glass or glass-ceramic electrolyte. The atomic structural nature of the electrolyte will be described further in this specification with reference to FIG. 3.

Obviously, several different lithium-containing (or sodium-containing) glass or glass-ceramic compositions may be formed from the listed suitable constituents and others. But the resulting selected composition must interact with a lithium metal anode and be capable of conducting a suitable number of lithium ions through its glass or glass-ceramic microstructure in the repeated cyclic operation of the lithium-based battery cell(s).

One example of a suitable lithium-containing, sulfide glass composition is, in molar proportions, $60LiS.28SiS_2.12P_2A_5$. This composition may be prepared by combining particles of the three individual constituents in the indicated molar proportions and melting them together, under argon (for example), as a uniformly-mixed liquid composition in a suitable inert vessel at a temperature of about 1000° C. In a preferred embodiment, the melt is then solidified as an amorphous, glassy body and comminuted into small glassy particles for subsequent consolidation as a thin layer of the intermixed composition. In a preferred or commercial embodiment, an amorphous solid layer, or a layer with an amorphous matrix enveloping non-contacting crystalline regions (sometimes termed "glassy-ceramic" herein), is formed having a thickness in the range of about ten micrometers to about two hundred micrometers.

As will be described in detail below in this text, the layer of particles may be deposited for processing on a suitable substrate layer, such as a quartz substrate, or other suitable non-reactive and temperature-resistant surface. Preferably the powder is deposited in a shaped layer with a thickness and area profile which may be consolidated into the configuration of a glass electrolyte body (or a group of such bodies in the same layer) for assembly with a like-shaped anode and other members of the battery cell. The consolidated body may be annealed to remove stress sites from the consolidation and to provide a microstructure which is either wholly amorphous (glassy) or which contains small (nanometer-size) crystalline bodies isolated from each other in an amorphous matrix (glass-ceramic). This microstructure is used to resist penetration of the solid electrolyte by dendrites formed on the lithium (or sodium) metal anode during repeated cycling of a battery cell.

The ultimate composition of the constituents combined in the melt is determined to provide a glass, glass-ceramic, or ceramic composition (with the described microstructure) that can accommodate the suitable transport of lithium ions under the electrochemical potential attained by suitably engaging electrodes separated by the glassy composition. For example, the subject composition can provide mobile lithium cations associated with sulfur-containing anions that are generally fixed in the molecular structure. And the thickness and composition of the glass layer is such that it is capable of being flexed or rolled in arcuate configurations In accordance with practices of this disclosure, the consolidated electrolyte layer, is subjected to a passivation process. The workpiece may consist of one electrolyte body or a self-sustaining layer with an area containing several electrolyte bodies which will be later separated for assembly into a lithium battery cell.

In one embodiment, the passivation may be performed while an electrolyte glass or glass-ceramic layer, formed on a substrate layer is still supported on its substrate. This example is described in detail below in this specification. In another embodiment, the passivation is performed on a thin ceramic electrolyte layer which may also be supported on a substrate during passivation. A very thin coating (e.g., about two to twenty nanometers in thickness) of aluminum oxide, or other suitable oxide such as zirconium oxide, is applied by atomic layer deposition (ALD) to the upper surface of the electrolyte shape(s).

The upper surface of a just-formed electrolyte member layer may be coated with a passivation layer while the electrolyte body is still carried on a forming substrate. The formed electrolyte layer member may be at a forming temperature or it may be re-heated to a selected temperature. In one example, the ALD process for the formation of aluminum oxide may be performed stepwise over the full width of the supported electrolyte layer and progressively along its length. For example, dry nitrogen as a carrier gas may be used to successively deliver trimethyl aluminum (TMA) vapor, an aluminum precursor, and ozone ($O_3$), (a preferred oxygen precursor for lithium sulfide and oxysulfide glasses) in separate directed and controlled streams against the upper surface of the electrolyte. Water may be substituted for ozone and used as a source of oxygen. First a stream of nitrogen may be used to clear residual air from the electrolyte surface. Then a nitrogen-borne stream of TMA is directed against a selected length of the electrolyte surface and across its width. The TMA reacts with the surface, depositing an atomic layer of aluminum across the width of the electrolyte surface. Reaction by-products are carried away in the nitrogen stream to a recovery location. Immediately following the formation of a width-wise strip of atomic aluminum on the glass or ceramic electrolyte, a nitrogen-ozone stream is directed against the aluminum to form a molecular layer of aluminum oxide that is, for example, approximately a tenth of a nanometer in thickness. This sequence of precursor depositions is cyclically repeated over the full upper surface of the glass electrolyte until a suitable thickness of aluminum oxide (e.g., up to about ten to twenty nanometers) is formed on the surface of the electrolyte to be engaged by a like-shaped, co-extensive layer of a lithium metal anode.

As will be recognized by one skilled in the art of the use of ALD in other applications, the steps of the ALD process may be performed, for example, (i) at atmospheric pressure using a carrier gas for the precursor, (ii) under vacuum with a carrier gas, or (iii) under vacuum without a carrier gas.

In one example, the electrolyte composition was formed from a mixture, $60LiS.28SiS_2.12P_2S_5$ (molar proportions). The alumina-coated electrolyte member was then be assembled face-to face with a lithium metal anode. After assembly with the Li metal anode the ALD coating is suitably thermally activated. $Al_2O_3$ is both an ionic and electronic insulator. During the activation process the $Al_2O_3$ reacts with the lithium in the surface of the facing anode. This reaction provides a lithium-containing coating with a degree of ionic conductivity, but the coating largely remains an electronic insulator. Activation entails the diffusion of lithium into the $Al_2O_3$ layer forming a $Li_xAlO_2$ phase.

Depending on the thickness of the ALD layer it may be preferred to heat the anode/electrolyte interface to accelerate the activation process. Increasing the temperature decreases the time needed for sufficient infiltration of lithium atoms from the anode to impart the passivation coating structure with lithium-ion conductivity. Thermal activation may occur at any temperature below the melting point of lithium (180° C.). Selection of the activation temperature is dependent upon the thickness of the passivating coating material (e.g., $Al_2O_3$, $ZrO_2$, or a like electron insulator)

The electrolyte member is thus shaped, passivated, activated, and prepared for assembly with a like-shaped lithium metal anode in a lithium battery cell. The lithium-containing electrolyte is also often capable of serving as a lithium-ion-conducting separator between the lithium anode and a compatible cathode in an assembled battery cell.

The above described formation and adaptation of a metal oxide passivation layer is useful on the family of lithium sulfide-based, lithium oxysulfide-based, and lithium oxide or phosphate-based electrolyte structures. And while it is preferred that the sulfide-based glass electrolyte members be formed by consolidation of suitable sulfide-containing powders, the subject passivation treatment may be used with like glass, glass-ceramic, or ceramic electrolyte compositions formed by other processes.

In another embodiment of the disclosure, the lithium ion or sodium-ion-conducting sulfide and/or oxysulfide glass-glass ceramic may be passivated by the chemical vapor deposition onto its surface of a layer of lithium phosphorus oxynitride ($Li_{2.9}PO_{3.3}N_{0.36}$, LIPON). LIPON is formed on the surface of the sulfide-oxysulfide glass by RF magnetron sputtering of lithium phosphate ($LiPO_4$) in the presence of nitrogen. After the LIPON passivation layer has been formed on the surface of the sulfide or oxysulfide glass electrolyte/separator member, an anode layer of lithium (or sodium) is placed against the passivation layer in the assembly of the anode and electrolyte layers.

The combination of the anode layer and activated glass electrolyte layer is then ready for assembly with a cathode layer in a lithium-based or sodium-based battery cell package.

Drawings as described in the next section of this specification provide further basis for the description of further examples of practices of this disclosure.

BRIEF DESCRIPTION OF THE DRAWINGS

FIG. 3 is redrawn from B. E. Warren, *J. Am. Ceram. Soc.*, 24 (1941) 256, which is reference 108 in S. W. Martin, "Glass and Glass-Ceramic Sulfide and Oxy-Sulfide and Oxy-Sulfide Solid Electrolytes," *Handbook of Solid State Batteries*, 2016.

In FIG. 4 the passivation layer on the surface of the glass electrolyte layer has been thermally activated in the presence of the lithium metal anode. In FIG. 4, a portion of the lithium metal anode is broken-away to show the thin activated lithium-containing aluminum oxide layer on the facing surface of the glass electrolyte. A cathode layer is also illustrated in FIG. 4, the cathode layer being positioned for assembly against the opposite side of the glass electrolyte/separator layer in the preparation of a lithium battery cell structure.

DESCRIPTION OF PREFERRED EMBODIMENTS

Figure 1:
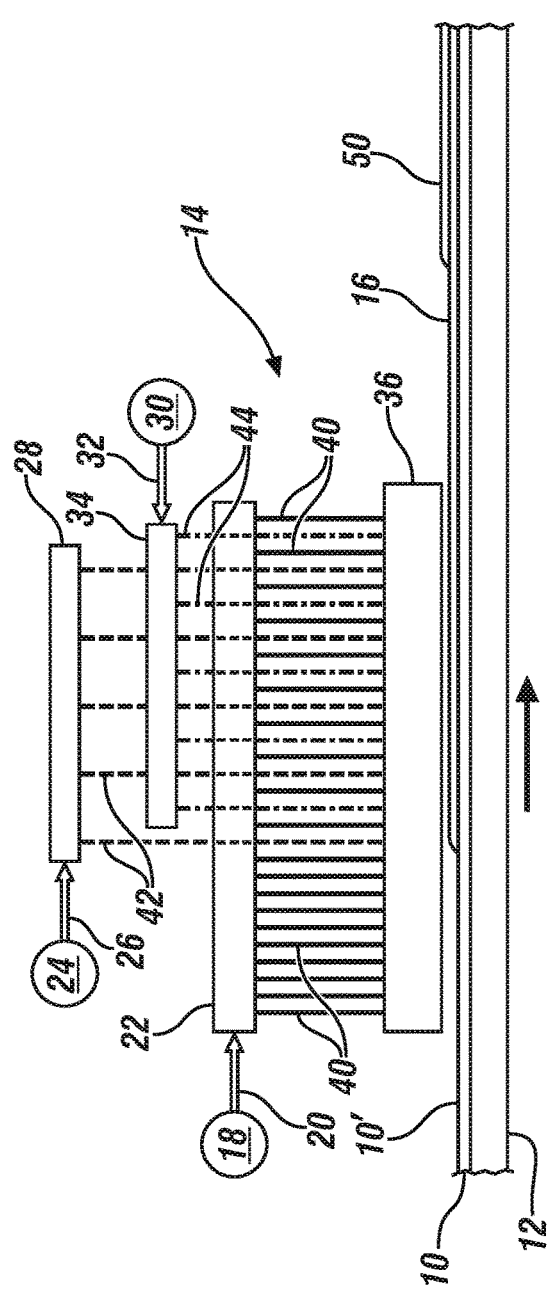
FIG. 1 is a schematic illustration of a method and apparatus for the formation of a passivation coating of aluminum oxide on the upper surface of formed lithium sulfide-based glass electrolyte member supported on a movable substrate layer.

This disclosure pertains to the passivation of lithium-ion conductive and sodium-ion conductive glass, glass-ceramic, and ceramic electrolyte compositions that are thermodynamically unstable in a battery cell when placed in surface-to-surface contact with a lithium metal or sodium metal anode in an assembly of otherwise operable cell components. The direct reaction of the alkali metal anode material with such glass electrolyte compositions tends to form compositional barriers to the transport of alkali metal ions into the intended electrolyte. For purposes of illustration, an embodiment of the subject passivation process will be demonstrated using a representative sulfide glass electrolyte layer for lithium metal batteries and sodium metal batteries. However, substantially the same ALD process may be used to passivate the surfaces of the general families of like, unstable-to-alkali-metal, glass, glass-ceramic, and ceramic compositions as described in this specification. Further, much of the description provided in this text is directed to the presently more commonly used lithium-based batteries. However, in most instances, and unless otherwise stated, each described process step can be performed on a sodium-based battery of complementary composition.

As stated, sulfide-based or oxysulfide based glasses and glass-ceramics, containing either lithium ions or sodium ions, are useful as solid electrolytes in electrochemical cells, particularly in cells which employ an alkali metal as an anode during cell discharge. The sulfide or oxysulfide-based glass electrolyte structure may also serve as an alkali metal ion-conducting separator with face-to-face contact between the co-extensive metal anode layer and a complementary co-extensive cathode layer.

The separator function of the electrolyte layer is also important since a lithium metal anode, initially of uniform thickness, develops local variation in thickness with successive discharge-charge cycles. These local thickness variations manifest themselves as dendrites, elongated, spear-like features, which protrude from the bulk lithium metal layer and, if suitably extensive may bridge the gap between anode and cathode to produce a short circuit. Thus, the thin glass electrolyte film should be suitably robust to mechanically obstruct such dendrites. In addition, the film should be resistant to chemical or metallurgical infiltration of lithium to prevent formation of a lithium metal 'bridge' through the electrolyte/separator which would likewise enable direct electrical interconnection of anode and cathode. Resistance to such chemical and metallurgical infiltration is conferred by the absence of grain boundaries in amorphous structures.

A wide range of sulfide and oxy-sulfide compositions may be employed, each incorporating a glass former and a lithium-containing glass modifier. Suitable sulfide-based glass formers include $P_2A_5$, $GeS_2$, $SiS_2$, $As_2S_3$ and $SnS_2$ which may be combined with $Li_2S$ etc. As stated earlier, for a sulfide glass both the glass former and the glass modifier will contain sulfur (e.g. $Li_2S$—$P_2A_5$). For an oxy-sulfide glass it will either be an oxide-forming system with a sulfide co-former (e.g. $Li_2O$—$P_2O_5$—$P_2A_5$) or a sulfide-forming system with an oxide co-former (e.g. $Li_2S$—$P_2A_5$-$P_2O_5$). $Li_4SiO_4$, $Li_3PO_4$, lithium halides and their sodium-based counterparts are dopants which may be used to improve glass formability and/or stability as well as enhancing ionic conductivity.

An exemplary, but non-limiting glass-forming system may be based on $P_2A_5$ (phosphorus pentasulfide) as the glass former and $Li_2S$ (lithium sulfide) as the glass modifier. Of course, $Li_2S$ also serves to contribute the $Li^+$ lithium ions to the resulting glass and impart the desired lithium ion conductivity to the glass. A wide range of proportions of these constituents may yield suitable glasses. One exemplary, but non-limiting, starting composition is $70Li_2S.30P_2S_5$. Another example is $60LiS.28SiS_2.12P_2S_5$.

As noted, a major consequence of the relative proportions of the glass former and the lithium-containing glass modifier is to vary the concentration of lithium ions ($Li^+$) in, and consequently the conductivity of, the resulting glass. In addition, the viscosity of the resulting glass and fluidity of the glass melt are also affected by the relative concentration of glass former and modifier, or equivalently, by the glass composition with processing consequences which will be covered below.

Figure 3:
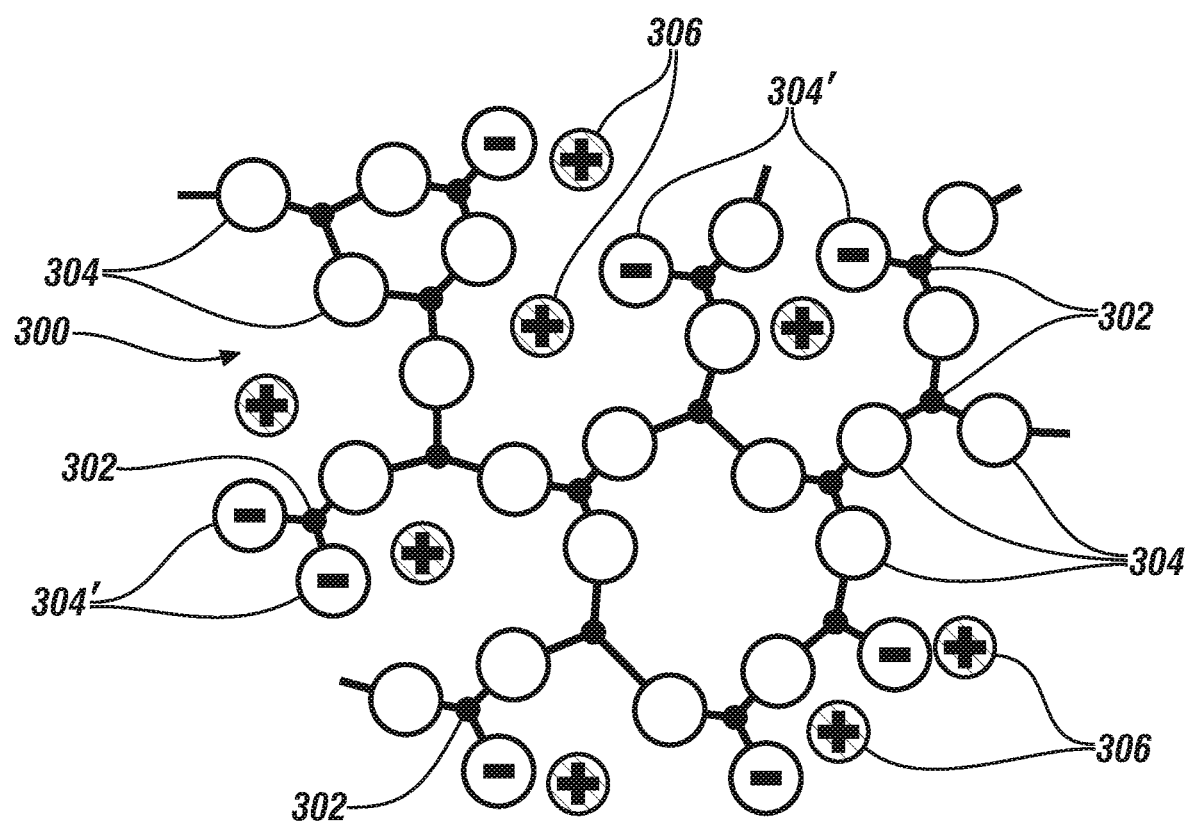
FIG. 3 is a two-dimensional representation of ionically bonded monovalent lithium cations (+) distributed in a glass composition of mixed ionic, non-bridging sulfur atoms and covalent, bridging sulfur atoms of the glass structure.

For example, FIG. 3 is a schematic, two-dimensional representation of a glass structure 300 which may be formed using suitable proportions of $Li_2S$ and $P_2S_5$. In the illustration of FIG. 3, the several small dark circles 302 represent atoms of the glass former, phosphorus. Other suitable sulfide-glass formers include boron, germanium, silicon, and/or tin. The several larger open circles, 304, represent sulfur atoms. Many of the sulfur atoms 304 are covalently bonded to phosphorus atoms 300. These sulfur atoms 304 have no charge. But some of the sulfur atoms 304' are positioned so as to be ionically-charged and function in the glass structure 300 as anions with their negative charge. Illustrated as associated with the sulfide anions 304' are the mobile, positively-charged, lithium cations 306. The lithium cations 306 are mobile and flow from the lithium metal anode through the solid electrolyte layer to the cathode material on the other side of this glass electrolyte/separator material during discharge of the battery cell. The lithium cations flow in the opposite direction when the cell is being charged. Such glass compositions serve well as electrolyte materials in lithium metal batteries providing lithium ions, forming at the lithium metal anode, which can cross the interface and enter the electrolyte material.

These alkali metal-based, sulfide and oxysulfide containing glass electrolyte layers may be prepared by different forming practices. One such practice is to form glass layers by the managed solidification (starting with a surface skin and proceeding inwardly) and concurrent shaping of continuous downward flowing bars or strips of a selected molten sulfide-based composition. In other practices, the alkali metal-based sulfide-oxysulfide glass electrolyte layers may be formed by suitable consolidation of small particles of the mixed, melted, and re-solidified composition into a suitably shaped solid glass electrolyte structure or member.

A preferred practice for forming the glass electrolyte is described below in this specification with reference to FIG. 2 of the drawings.

But regardless of the method of their preparation, the alkali metal-based, sulfide and oxysulfide containing glass electrolytes are not thermodynamically stable when assembled in face-to-face contact with a lithium metal or sodium metal anode and subjected to the repeated cycling of a lithium-based or sodium-based battery cell.

In accordance with practices of this disclosure, regardless of how it was formed, at least the anode-contacting surface of the glass electrolyte is passivated by atomic layer deposition of a suitable metal oxide as disclosed in this specification with reference to FIG. 1.

As stated above in this specification, the lithium sulfide and/or oxysulfide glass electrolyte layers formed for use in assembled lithium metal batteries are to have a thickness in the range of about ten micrometers to about two hundred micrometers. Apart from their thickness, the electrolyte layers have a two-dimensional shape or areal shape (sometimes called plan-view) which is often circular or rectangular. The shape of the electrolyte/separator is substantially the same as the overlying shapes of the lithium metal anode and the corresponding compatible cathode between which the electrolyte/separator member is placed when the battery cell(s) are assembled and packaged. In accordance with an illustrative practice of this invention, a glassy electrolyte body layer or a group of readily separable electrolyte bodies handled as a layer are placed on a substrate layer for the atomic layer deposition of an aluminum oxide (for example) passivating layer on the exposed upper surface of electrolyte body.

In the illustration of FIG. 1, a thin electrolyte layer 10 is placed with one side down on a supporting substrate layer 12. In the illustration of FIG. 1, the electrolyte layer 10 is depicted as a broken-off view portion of a relatively large area layer (for efficient processing) of the glassy or glass-ceramic lithium sulfide/oxysulfide-based electrolyte material. The electrolyte layer 10 is intended to be passivated while on the supporting substrate 12, removed from the supporting substrate 12 as a relatively flexible unit, and then separated into more than one individual electrolyte members with one alumina-coated facial surface. The supporting substrate 12 may have been previously used in up-stream forming of the glassy electrolyte layer 12 or the electrolyte layer may have been removed from its support during previous processing and placed on a relatively thin polymeric or metallic support layer for positioning it relative to ALD processing equipment. Suitably, the electrolyte layer may be at a temperature in the range from ambient room temperature (20-25° C.) up to about 180° C.

In the illustration of FIG. 1, the lithium sulfide-based electrolyte glass layer 10 is slowly carried on support 12 in a horizontal path from left-to-right under an atomic layer deposition apparatus 14 for the progressive, step-wise, cyclic formation of a very thin layer of aluminum oxide 16 on the upper surface 10' of the electrolyte glass layer 10. The illustration of the respective electrolyte glass layer 10 and its aluminum passivating layer 16 are not to-scale for easier viewing of the respective layers. As stated in this specification, the thickness of the electrolyte glass layer 10 is typically in the range of about ten to two hundred micrometers and the thickness of the alumina passivation layer 16 is about two to twenty nanometers.

One type of ALD apparatus 14 is illustrated for schematic flow of the nitrogen gas, trimethyl aluminum vapor, and ozone gas that are used in this practice of the ALD process. A stream of dry nitrogen is delivered from a suitable source 18 (e.g., a vessel of liquid nitrogen) through a first nitrogen flow line 20 to a nitrogen gas delivery manifold 22. Trimethyl aluminum vapor is delivered from a TMA source 24 by bubbling nitrogen gas through the liquid TMA and directing the flowing nitrogen and TMA through a first TMA flow line 26 to a TMA delivery manifold 28 for the trimethyl aluminum. And a stream of ozone is delivered in a nitrogen gas stream from an ozone source 30 through a nitrogen-ozone flow line 32 to a nitrogen-ozone delivery manifold 34.

In FIG. 1, the illustrated ALD delivery system has a total of thirty vertical flow lines for carrying nitrogen gas and the two nitrogen-borne precursor streams from their respective manifolds vertically downward to a coating head 36 which holds the outlets of the respective flow lines within a millimeter or so of the upper surface 10' of the glass electrolyte layer 10. The coating head 36 is configured to hold the respective flow lines apart (e.g. 20 mm apart) and to hold the outlets of the flow lines (not illustrated) close to surface 10'. The respective outlets may be in the shape of slots which correspond to the width of the glass electrolyte surface 10' or to a specified portion of the width of the surface 10'.

In the illustration of FIG. 1, the ALD process proceeds, suitably in a dry air atmosphere at atmospheric pressure, as the warmed glass electrolyte layer is moved from left to right by the controlled slow movement of its supporting substrate 12. In the embodiment of FIG. 1, the flow of pure dry nitrogen is managed through the twenty nitrogen flow lines 40 (depicted as solid lines in FIG. 1) leading from nitrogen manifold 22 to their respective spaced apart outlets in coating head 36. Five vertical flow lines 42 (depicted as dashed lines) carrying a nitrogen-TMA gas-vapor mixture extend downwardly from TMA manifold 28, through or around nitrogen manifold 22, to their placed outlets at the coating head 36. And five vertical flow lines 44 (depicted as dash-dot lines) carrying the nitrogen and ozone mixture extend downwardly from ozone manifold 34 to their specifically located outlets at the coating head 36.

Each portion of the width of the upper surface 10' of glass electrolyte layer 10 passes under the respective spaced nozzle outlets of coating head 36 at a timed, continuous rate or timed incremental advance-stop rate. Each incremental surface 10' portion across the width of glass electrolyte layer 10 is purged of air, cleaned, and optionally heated by a flow of nitrogen from the first ten nitrogen flow lines 40. Each surface portion 10' then receives a flow of trimethylaluminum carried in nitrogen gas through flow lines 42. The trimethylaluminum, striking the lithium sulfide-containing glass surface, reacts to deposit a layer of aluminum atoms. The underlying surface portion 10' then receives a steam of nitrogen and ozone (flow lines 44) which reacts immediately with the aluminum atoms to form alumina molecules in a layer 16 that is initially a fraction of a nanometer in thickness. Reaction by-products may then be recovered from a gathered nitrogen stream. The alumina layer 16 is flushed with a stream of nitrogen to complete a first ALD cycle. In the ALD apparatus illustrated in FIG. 1, this cycle of TMA delivery and reaction, nitrogen flow, ozone delivery and reaction, and nitrogen flow is repeated four more times by the carefully spaced arrangement of flow delivery lines 40, 42, 44, 40 as illustrated in the figure. An alumina passivation layer 16 is ultimately formed having a suitable thickness in the range of about two nanometers to about twenty nanometers. This passivation layer 16 will later be placed into contact with a lithium metal anode layer and thermally activated.

The ALD process may be repeated by successive passages of the supported glass electrolyte layer 10 under the same ALD apparatus 14 or additional ALD units downstream in a flow process from the first unit in order to obtain a desired thickness and pattern of the passivation layer.

While ozone was used as a precursor with TMA in the ALD passivation of sulfide glasses which are hygroscopic, water may be used in place of ozone in the ALD passivation of ceramics such as the perovskite structure (LLTO) or the NASICON structure (LATP) or certain oxide glasses.

As stated above in this specification, the steps of the ALD process may be performed in continuous, semi-continuous, and batch-wise processes, for example, (i) at atmospheric pressure using a carrier gas for the precursor, (ii) under vacuum with a carrier gas, or (iii) under vacuum without a carrier gas. Suitable processing equipment is known and available for the range of such ALD process practices.

In a suitable practice, once the alumina passivation layer has achieved a suitable thickness, a lithium metal anode member 50 (fifty to one hundred micrometers in thickness) may be placed on the passivation layer 16 on surface 10' of glass electrolyte member 10 in a downstream step. Alternatively, lithium metal may be vapor deposited as anode layer 50 on the passivation layer 16. Suitable work members of the lithium anode-covered/passivated glass electrolyte bodies may then be placed in a dry environment and heated to a suitable temperature up to about 180° C. to induce the diffusion of lithium into the alumina passivation layer to promote the formation of an activated $Li_xAlO_2$ phase, or like material phase, which is conductive of lithium ions but resistant to the flow of electrons.

The combination of the anode layer and glass electrolyte member with its activated, anode-contacting surface is then ready for assembly with a compatible cathode member and placement in a lithium battery cell package.

Figure 4:
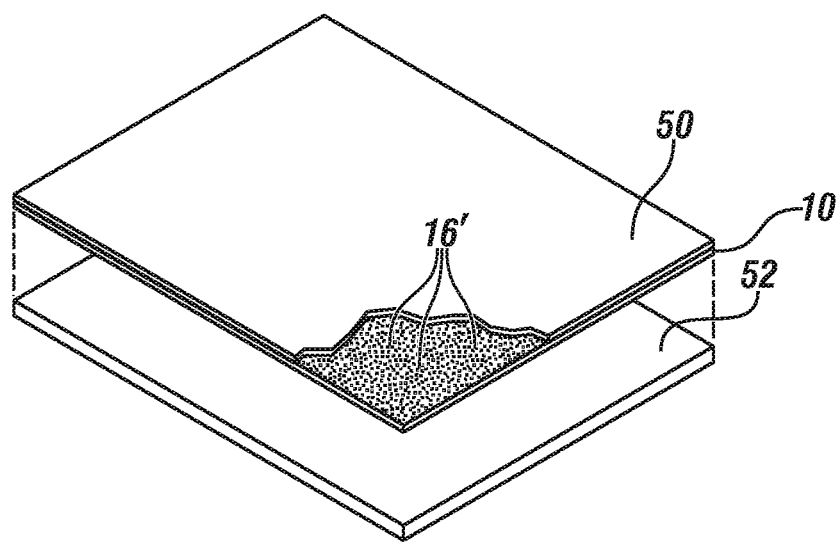
FIG. 4 is an oblique view, looking down on a lithium metal anode which has been applied to a sulfide glass electrolyte/separator layer member, initially having a passivation layer of alumina.

FIG. 4 is an oblique view, looking down on a lithium metal anode 50 which has been applied to a sulfide glass electrolyte/separator layer member 10, initially having a passivation layer of alumina. In FIG. 4, the passivation layer on the surface of the glass electrolyte layer has been thermally activated in the presence of the lithium metal anode 50. In FIG. 4, a portion of the lithium metal anode 50 is broken-away to show the thin activated lithium-containing aluminum oxide layer 16' on the facing surface of the glass electrolyte 10. A cathode layer 52 is also illustrated in FIG. 4, the cathode layer 52 being positioned for assembly against the opposite side of the glass electrolyte/separator layer 10 in the preparation of a lithium battery cell structure.

The above described ALD process may otherwise be conducted using nitrogen, ozone, and a suitable vapor-phase precursor for titanium (for example, titanium tetrachloride, $TiCl_4$) or zirconium (for example, tetrakis (dimethyl amido) zirconium, $Zr(NMe_2)_4$).

The ALD process is adaptable to the passivation of alkali metal-containing glass, glass-ceramic, and ceramic compositions described in this specification which provide suitable conductivity of the metal ions through a layer of the electrolyte material, but the electrolyte composition is thermodynamically unstable when placed against an alkali metal anion in a functioning battery assembly.

As stated, the ALD process may be beneficially practiced on the surface of members of the family of alkali metal sulfide and oxysulfide based electrolyte compositions, regardless of how the glass electrolyte member was formed. However, the ALD process is found to be particularly effective on lithium sulfide-based glass and glass-ceramic electrolytes when formed in accordance with practices described in a co-pending U.S. application filed by co-inventors in this application. Our co-pending application is titled, "Sulfide and Oxy-Sulfide Glass and Glass Ceramic Films for Batteries Incorporating Metallic Anodes." The application was filed Apr. 6, 2017 as application Ser. No. 15/480,505. Portions of our co-pending application are included in the following text of this specification and with respect to the description of the processing steps and equipment illustrated in FIG. 2 of this application.

A suitable exemplary method for fabrication of thin glass films from a glassy powder precursor is described below in conjunction with FIG. 2. FIG. 2 illustrates a process which employs, as its starting material, previously-prepared glassy powders with the composition of the intended thin glass film.

Figure 2:
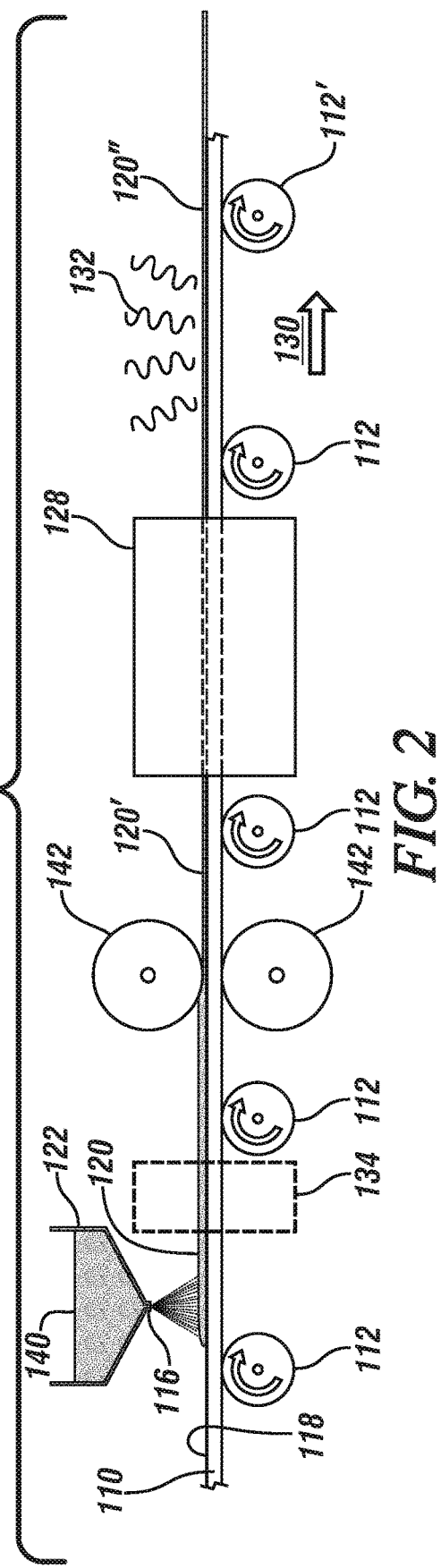
FIG. 2 is a side-view illustration of a method of forming a compacted lithium-containing sulfide or oxysulfide glass electrolyte layer by compaction of deposited particles the composition on a movable substrate layer.

FIG. 2 illustrates a process or fabrication zone 100 in which a process, which may be conducted in batch, semi-continuous, or continuous modes, for preparing predetermined lengths of such thin glass films which would subsequently be cut or otherwise fragmented into a plurality of discrete glass electrolyte sheets, suitably sized for the electro-chemical cell in which they are to be incorporated. The described process may readily be adapted to be conducted as a batch process, in which the individual steps may be conducted independently of one another and/or asynchronously to prepare a plurality of individual conductor sheets, not necessarily pre-sized for the electrochemical cell. For example, the processing steps may be performed at a series of individual stations with the in-process conductor sheets transported from station-to-station by pick-and-place automation, robots, conveyor belts or other suitable equipment.

As shown at FIG. 2, the thin glassy films are fabricated on a substrate 110, a portion of which is shown. Substrate portion 110 is carried on, and advances in, the direction of arrow 130 by the action of rollers 112, 112'. Substrate portion 110 may be a portion of a continuous belt which, at roller 112' loops under (not shown) substrate portion 110 and is carried in a direction opposite that of arrow 130 from roller 112' to roller 112 until it loops upwardly (not shown) at roller 112 to again participate in the process to be described. Alternatively, substrate 110 may be a portion of a large diameter annular disc which is supported and carried on radially oriented rollers 112 continually advancing in a single direction until a surface portion of substrate 110 completes a full revolution and returns to its starting point ready for re-use. It will be further appreciated that, in operation of such a continuous device there may be need for cleaning or surface treatment stations (not shown) to restore the substrate surface to a suitable condition for re-use. These features and characteristics are not illustrated and the following description will focus primarily on the sequence of fabrication steps occurring in fabrication zone 100 on substrate portion 110 as substrate portion 110 traverses the fabrication zone.

Substrate portion 110, with a smooth surface 118, is advanced by support rollers 112, 112' in the direction of arrow 130 so that it is progressively carried into fabrication zone 100. As will be described more fully below, the material of substrate portion 110 is subjected to a range of temperatures that generally do not exceed 350° C. Accordingly, a wide range of materials may be considered for use as a substrate. Generally, the choice of substrate material should be informed by the requirement that it exhibit suitable structural strength at the maximum temperature of interest, and that it be non-reactive with the sulfide/oxy-sulfide glass powder. Exemplary materials include quartz, stainless steels, and generally, metals and alloys with melting points of 1000° C. or greater. In some applications, it may be feasible to use a high temperature, possibly reinforced polymer such as polytetrafluoroethylene (Teflon) or polyetheretherketone (PEEK).

As substrate portion 110 advances, it passes below hopper 122 containing particles of solid glassy materials 140 and dispensing nozzle 116, both of which cooperate to apply, by gravity, glass powder 140, as a substantially uniformly thick powder layer 120, onto the surface 118 of substrate portion 110. Although a single hopper 122 and nozzle 116 are shown, it may be appropriate to employ multiple dispensing nozzles 116, fed by a single or multiple hoppers 122 to more uniformly apply powder layer 120 to the full width of substrate portion 110. Those of skill in the art will appreciate that various additional pieces of conventional equipment such as screw conveyers, vibratory screens etc. (not shown) may be employed to assure a uniform and continuous flow of such particulate matter.

Similarly, to achieve a generally uniform distribution and thickness of the powder particles on substrate portion 110 a device such as a doctor blade (not shown) or a vibratory exciter (not shown) may be used to more completely level the applied powder and render a generally uniform powder layer 120 downstream of hopper 122. Although not shown, it will be appreciated that powder may also be applied as a paste containing a volatile solvent that may be evaporated after deposition, by spray deposition, by electrostatic deposition or any other suitable means known to those of skill in the art.

Suitable solid glassy particles may be formed, for example by ball milling a bulk, solid glassy material. The powder preferably includes particles from a large number of size ranges to enable more complete packing of the power particles but the maximum particle size should be limited to no more than 15% of the thickness of powder layer 120.

It is intended that powder layer 120 be heated and compacted to form fully dense glassy layer 120'. Compaction may be effected by passing powder layer 120 between opposed, heated rollers 142. In one practice, powder layer 120 may optionally be preheated in an oven or furnace 134 (shown in ghost), or, rollers 142 may serve to both heat and compact the particles. For simplicity, only one set of rollers 142 is illustrated but a series of such heated rollers, each applying a predetermined degree of compaction until full or near-full density is achieved, may be employed. Of course, full density is most readily achieved when the packing fraction of powder layer 120 is highest, which, as noted, is promoted by accepting a wide range of a particle sizes, including fines, in powder 140. The term full density is intended to encompass a compacted body containing up to 15% residual porosity.

Suitable time-temperature-pressure combinations to achieve full density are related to the viscosity of the glass which must be sufficiently low that the glassy particles will flow under pressure, rather than fracturing. Hence, the glass be maintained above its Tg, its glass transition temperature. Typically, the viscosity of liquids, and super-cooled amorphous alloys, will decrease with increasing temperature suggesting that increased temperature will be beneficial. However, to maintain the glassy layer in a compactable but fully amorphous state, the compaction temperature may not exceed $T_c$, the crystallization temperature of the selected glass composition. Also, for production efficiency, the compaction time, or the time spent by powder layer 120 between the gap of rolls 142 cannot be excessive. Suitably the compaction temperature should be selected to be about 40° C. above $T_g$ but below $T_c$ both of which temperatures will vary with glass composition. Glasses compacted in this temperature range may be compacted in about 5-3600 seconds under a pressure of 0.1 to 360 MPa. Some suitable glass compositions include $xLi_2S \cdot (100-x-y)P_2S_5 \cdot yP_2O_5$ (x=50-90 and y=0-20) and which exhibit a $T_g$ of between 210° C. and 220° C. and a $T_c$ of between 220° C. and 280° C.

After compaction, compacted glassy layer 120' will likely exhibit internal stress(es) which, if not relieved may promote spontaneous fracture and fragmentation of the glassy sheet. To relieve the resulting internal stress, compacted glassy layer 120' passes through annealing furnace 128. The annealing time and temperature may be selected to relieve internal stresses while retaining either an amorphous microstructure or a partially crystallized microstructure. When a fully amorphous or glassy layer is desired, the annealing temperature should be maintained above Tg but below Tc to render a glassy layer 120" substantially free of internal stresses. As long as the temperature is less than Tc the annealing time may be selected consistent with the annealing temperature, with shorter annealing times being appropriate for higher annealing temperatures and longer annealing times being required for lower annealing temperature, as is well known to those of skill in the art.

In some aspects, it may be preferred that the microstructure in the glass layer 120" be partially crystalline. A partially crystalline microstructure comprising isolated, discontinuous nanometer-sized or micrometer-sized crystalline regions surrounded by amorphous material has been demonstrated to exhibit higher ionic conductivity and better resistance to penetration than a like-dimensioned fully amorphous body. The requirement that the crystalline phase be discontinuous limits the maximum fraction, by volume, of crystalline phase to be less than 60% with volumes as low as 1% being feasibly achieved. In a preferred aspect, the volume fraction of crystalline material should range from 20% to 40%. The development of such a microstructure requires that the annealing temperature be increased to above $T_c$ for at least a brief period.

The development of crystalline regions will occur by a nucleation and growth process in which a plurality of nanometer-sized or micrometer-sized crystalline regions develop in the amorphous material and slowly grow until the entirety of the amorphous layer is transformed to a crystalline phase. It is preferred to develop the desired microstructure of nanometer-sized or micrometer-sized islands of crystalline phase encapsulated in a continuous amorphous matrix. Such a structure may be developed by selecting an annealing temperature which is above, but close to $T_c$, to limit the number of nuclei and hence increase their separation. An annealing temperature close to $T_c$ will also serve to reduce diffusion (relative to a higher annealing temperature) and so slow the growth of the crystalline regions enabling more flexibility in controlling of the process. Optionally, a multi(temperature)-zone furnace 128 may be employed to at least partially decouple the nucleation process from the growth process, for example by heating to above Tc before decreasing the temperature below Tc point for continued annealing to promote more controllable growth of the crystalline regions.

The mechanical and thermal cycles to which the glass powder 120 is subjected produces stages of changing particle structures and microstructures. At The initial powder layer 20 typically comprises a plurality of layered glassy particles of varying sizes separated by interparticle voids. The particles are maintained in close proximity by application of pressure. On heating to a temperature greater than $T_g$, the glassy material will begin to exhibit macroscopic flow in response to pressure P. Also, some atom transport will occur through diffusion. The combination of macroscopic flow and diffusion, under the urging of applied pressure P will compact and consolidate the particles, eliminating many of the interparticle voids and consolidating the particles into an amorphous or glassy body, likely incorporating some remnant voids. In the compacted electrolyte glass layer, the amorphous boundary regions will be indistinguishable from the amorphous particle interiors and so will not be identifiable.

If the annealing temperature TA is chosen to be less than $T_c$ only stress relief will occur and the annealed glass electrolyte body, although substantially stress-free will be, microstructurally, identical to its body structure at the end of the compaction step. If, however, the annealing temperature TA is chosen to be greater than $T_c$ then not only will the stresses be relieved but small, irregularly-shaped, but generally equi-axed crystalline regions will develop, separated in the amorphous matrix of the glass electrolyte body. The size of these, generally equi-axed crystalline regions may be characterized by a characteristic dimension which may be the diameter of a sphere sufficient to circumscribe the crystalline region.

On exiting the annealing furnace 128 the layer 120" slowly cools, by radiation as indicated at 132 in FIG. 2, to room temperature or about 20-25° C. At this stage, the glassy layer may be removed from the substrate and processed appropriately to prepare it for use in an electrochemical cell. In the practice of this disclosure, the lithium sulfide/oxysulfide-based electrolyte glass layer will have a surface provided with an aluminum oxide passivation layer by the above-described ALD process.

With respect to the formed glass electrolyte body layer-since, the required processing temperatures are generally low to moderate, the smooth substrate surface 118 is not expected to react, bond to or otherwise engage with the glass layer. Thus, the glassy electrolyte layer 120" may be readily separated from substrate portion surface 118 without introducing any deformation or damage to either the glassy layer 120" or of substrate portion surface 118. Thus, substrate portion surface 118 will, possibly absent some minor cleaning etc., be immediately available for re-use to enable the continued production of the continuous layer glassy layer 120".

Glassy electrolyte layer 120" is then ready for application of its passivation layer as workpiece 10 in the ALD process illustrated with respect to FIG. 1 of this specification.

While the process for forming a lithium sulfide/oxysulfide-based glass or glass-ceramic electrolyte body illustrated with respect to the process flow of FIG. 2 is a preferred and useful process, the subject ALD process may be used to passivate the surface of an otherwise-prepared alkali metal anode contacting surface of such sulfide glass and glass-ceramic based electrolytes.

And as described above in this specification, the ALD passivation process is likewise suitable for the treatment of other oxide-type glass, glass-ceramic, or ceramic solid electrolyte compositions conductive of alkali metal ions, but unstable in surface-to-surface contact with alkali metal anodes in a battery cell assembly. Lithium-containing perovskite glass formers and lithium aluminum titanium phosphate glass formers have been used in forming useful lithium ion conducting electrolyte structures which are not stable in contact with lithium metal anodes in operating battery cell environment.

Also, as stated above in this specification, lithium ion or sodium ion-conducting sulfide or oxysulfide glass or glass-ceramic electrolytes may alternatively be passivated by chemical vapor deposition onto their surface of a layer of lithium phosphorus oxynitride ($Li_{2.9}PO_{3.3}N_{0.36}$, LIPON). The deposition may be accomplished by RF sputtering of lithium phosphate into nitrogen gas and depositing the sputtered material as LIPON onto the surface of the sulfide or oxysulfide glass or glass ceramic. Preferably, the thickness of the LIPON passivation layer is in the range of about one hundred nanometers to about five micrometers. After the LIPON passivation layer has been formed on the surface of the glass electrolyte/separator member, an anode layer of lithium (or sodium) is placed against the passivation layer of the glass electrolyte member in the assembly of a cell.

Thus, the above-described passivated practices are presented for illustration of suitable examples and not for limitation of the following claims.

The invention claimed is:

1. A method of treating a surface of a solid glass, a glass-ceramic, or a ceramic electrolyte body in preparation for the electrolyte body surface to be placed against the surface of an alkali metal anode electrode in the assembly of an alkali metal-based battery cell, the alkali metal being one of lithium and sodium, the solid glass or glass-ceramic electrolyte body being formed from alkali metal sulfides and glass forming sulfides or glass forming oxides, the ceramic electrolyte body comprising an alkali metal and oxygen, the glass, glass ceramic, or ceramic electrolyte body having mobile alkali metal cations, the solid glass, glass-ceramic, or ceramic electrolyte body being thermodynamically unstable, as is, with respect to the conduct of alkali metal cations when in contact with the alkali metal anode during operation of the battery cell, the method comprising:
 forming a passivation coating of a metal oxide on the surface of the glass, glass-ceramic, or ceramic electrolyte body, the metal oxide coating being formed by repeated cycles of atomic layer deposition, each cycle being (i) the deposition of a layer of metal atoms from a metal precursor compound followed by (ii) the deposition of oxygen atoms, the oxygen atoms reacting with the metal atoms to form the metal oxide, the cycles of atomic layer deposition being repeated until a metal oxide coating at least two nanometers in thickness is formed over the surface of the glass, glass-ceramic, or ceramic electrolyte body to be placed against the surface of the alkali metal anode in operation of the battery cell; and, thereafter
 placing the metal oxide layer coating on the surface of the glass, glass-ceramic, or ceramic electrolyte body against the surface of the alkali metal anode and promoting a reaction between the metal oxide coating and the alkali metal anode body to incorporate alkali metal atoms from the alkali metal electrode into the metal oxide of the coating, the coating then being conductive of alkali metal ions but resistant to the flow of electrons.

2. A method of treating a surface of a solid electrolyte body as stated in claim 1 in which the thickness of the solid electrolyte body is in the range of ten micrometers to two hundred micrometers.

3. A method of treating a surface of a solid electrolyte body as stated in claim 1 in which the thickness of the metal oxide coating, as applied, is in the range of two nanometers to twenty nanometers.

4. A method of treating a surface of a solid electrolyte body as stated in claim 1 in which the metal for the metal oxide coating is selected from the group consisting of aluminum and zirconium.

5. A method of treating a surface of a solid electrolyte body as stated in claim 1 in which trimethyl aluminum is used in the atomic layer deposition process and aluminum oxide is formed as the passivation layer on the surface of the electrolyte body.

6. A method of treating a surface of a solid electrolyte body as stated in claim 1 in which the composition of the solid electrolyte body is formed using lithium disulfide or sodium disulfide.

7. A method of treating a surface of a solid electrolyte body as stated in claim 1 in which the composition of the solid electrolyte body is formed using one or more of phosphorus pentasulfide, silicon disulfide, germanium disulfide, tin disulfide, and phosphorous pentoxide.

8. A method of treating a surface of a solid electrolyte body as stated in claim 1 in which the composition of the solid electrolyte body is formed using one or more of a lithium-containing perovskite or a sodium containing perovskite.

9. A method of treating a surface of a solid electrolyte body as stated in claim 1 in which the composition of the solid glass electrolyte body is formed using the NASICON structured electrolyte, lithium aluminum titanium phosphate.

10. A method of treating a surface of a solid electrolyte body as stated in claim 1 in which the composition of the solid electrolyte body is formed using one of dilithium oxide or dilithium sulfide in combination with phosphorus pentoxide and phosphorus pentasulfide.

11. A method of treating a surface of a solid glass or glass-ceramic electrolyte body in preparation for the electrolyte surface to be placed against the surface of an alkali metal anode in the assembly of an alkali metal-based battery cell, the alkali metal being one of lithium and sodium, the solid glass or glass-ceramic electrolyte body being formed from (i) lithium disulfide or sodium disulfide and (ii) one or more of phosphorus pentasulfide, silicon disulfide, germanium disulfide, and phosphorus pentoxide, such that the glass electrolyte has mobile alkali metal cations, the solid glass or glass-ceramic electrolyte body being formed with an amorphous microstructure or an amorphous matrix with dispersed, non-contacting crystals, the solid glass or glass-ceramic electrolyte body being thermodynamically unstable, as is, with respect to the conduct of alkali metal cations when in contact with the alkali metal anode during operation of the battery cell, the method comprising:
 forming a passivation coating of a metal oxide on the surface of the glass electrolyte body, the metal oxide coating being formed by repeated cycles of atomic layer deposition, each cycle being (i) the deposition of a layer of metal atoms from a metal precursor compound followed by (ii) the deposition of oxygen atoms from ozone, the oxygen atoms reacting with the metal atoms to form the metal oxide, the cycles of atomic layer deposition being repeated until a metal oxide coating at least two nanometers in thickness is formed over the surface of the glass electrolyte body to be placed against the surface of the alkali metal anode in operation of the battery cell; and, thereafter
 placing the metal oxide layer coating on the surface of the glass electrolyte body against the surface of the alkali metal anode and promoting a reaction between the metal oxide coating and the alkali metal electrode body to incorporate alkali metal atoms from the alkali metal electrode into the metal oxide of the coating, the coating then being conductive of alkali metal ions but resistant to the flow of electrons.

12. A method of treating a surface of a solid glass or glass-ceramic electrolyte body as stated in claim 11 in which the thickness of the solid glass or glass-ceramic electrolyte body is in the range of ten micrometers to two hundred micrometers.

13. A method of treating a surface of a solid glass or glass-ceramic electrolyte body as stated in claim 11 in which the thickness of the metal oxide coating, as applied, is in the range of two nanometers to twenty nanometers.

14. A method of treating a surface of a solid glass or glass-ceramic electrolyte body as stated in claim 11 in which the metal for the metal oxide coating is selected from the group consisting of aluminum and zirconium.

15. A method of treating a surface of a solid glass or glass-ceramic electrolyte body as stated in claim 11 in which trimethyl aluminum is used in the atomic layer deposition process and aluminum oxide is formed as the initial passivation layer on the surface of the glass electrolyte body.

16. A method of treating a surface of a solid glass or glass-ceramic electrolyte body as stated in claim 11 in which the electrolyte body composition is formed from the mixture $60LiS.28SiS_2.12P_2S_5$ (molar proportions), the metal oxide passivation coating layer is formed of $Al_2O_3$, and the metal oxide coating layer is placed and assembled against the surface of a lithium metal anode and the assembly is thermally activated to diffuse lithium into the $Al_2O_3$ layer to form a $Li_xAlO_2$ phase in the $Al_2O_3$ layer.

\* \* \* \* \*